(12) United States Patent
Ajisaka (10) Patent No.: US 9,944,173 B2
(45) Date of Patent: Apr. 17, 2018

(54) VEHICLE FLOOR LOWER STRUCTURE

(71) Applicant: TOYOTA JIDOSHA KABUSHIKI KAISHA, Toyota-shi, Aichi-ken (JP)

(72) Inventor: Satoshi Ajisaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/247,180

(22) Filed: Aug. 25, 2016

(65) Prior Publication Data

US 2017/0106743 A1    Apr. 20, 2017

(30) Foreign Application Priority Data

Oct. 20, 2015  (JP) ................................. 2015-206559

(51) Int. Cl.
*B60K 15/063*   (2006.01)
*B60K 13/04*    (2006.01)
*B62D 25/20*    (2006.01)

(52) U.S. Cl.
CPC ............ *B60K 15/063* (2013.01); *B60K 13/04* (2013.01); *B62D 25/20* (2013.01); *B60K 2015/0634* (2013.01)

(58) Field of Classification Search
CPC ............ B60K 2001/0438; B60K 13/00; B60K 15/00; B60K 2015/0631
USPC ............................. 180/68.5, 309, 69.4, 69.5
See application file for complete search history.

(56) References Cited

U.S. PATENT DOCUMENTS

| | | | | |
|---|---|---|---|---|
| 6,026,974 A | * | 2/2000 | Burt | ..... B60K 15/00 220/23.4 |
| 7,237,644 B2 | * | 7/2007 | Matsumoto | ..... B60K 13/04 180/309 |
| 7,654,351 B2 | * | 2/2010 | Koike | ..... B60K 1/04 180/68.1 |
| 7,743,863 B2 | * | 6/2010 | Shindou | ..... B60K 1/04 180/68.5 |
| 8,887,695 B2 | * | 11/2014 | Aso | ..... F02M 25/0854 123/518 |
| 8,978,617 B2 | * | 3/2015 | Matsuda | ..... F02B 77/00 123/198 E |
| 9,139,074 B2 | * | 9/2015 | Jarocki | ..... B60K 1/04 |

(Continued)

FOREIGN PATENT DOCUMENTS

| | | |
|---|---|---|
| JP | 2000-085382 A | 3/2000 |
| JP | 2005-247177 A | 9/2005 |

(Continued)

*Primary Examiner* — Jeffrey J Restifo
(74) *Attorney, Agent, or Firm* — Oliff PLC (57) ABSTRACT

A vehicle floor lower structure includes: a floor panel configuring a floor of a vehicle and formed with a floor tunnel, that projects out toward a vehicle body upper side and extends along a vehicle body front-rear direction, the floor tunnel is disposed at a vehicle width direction center of the floor panel; a fuel tank that is disposed at a vehicle body lower side of the floor panel and that includes a main tank section disposed inside the floor tunnel and an extension tank section that is disposed inside the floor tunnel and that projects out from the main tank section toward a vehicle body front side or a vehicle body rear side; and an exhaust pipe that is routed so as to pass by inside the floor tunnel at a vehicle width direction outer side of the main tank section and the extension tank section.

4 Claims, 8 Drawing Sheets

(56) References Cited

U.S. PATENT DOCUMENTS

| | | | |
|---|---|---|---|
| 9,499,205 B1* | 11/2016 | Elia | B62D 21/15 |
| 2004/0069551 A1* | 4/2004 | Greil | B60K 15/067 |
| | | | 180/69.4 |
| 2004/0099465 A1* | 5/2004 | Matsumoto | B60K 13/04 |
| | | | 180/309 |
| 2005/0211496 A1 | 9/2005 | Ito et al. | |
| 2006/0238000 A1* | 10/2006 | Tohda | B60K 13/04 |
| | | | 296/204 |
| 2006/0289224 A1* | 12/2006 | Ono | B60K 1/04 |
| | | | 180/311 |
| 2007/0240926 A1* | 10/2007 | Chae | B60K 13/04 |
| | | | 180/309 |
| 2008/0000703 A1* | 1/2008 | Shindou | B60K 1/04 |
| | | | 180/68.5 |
| 2008/0196957 A1* | 8/2008 | Koike | B60K 1/04 |
| | | | 180/68.5 |
| 2008/0283316 A1* | 11/2008 | Ono | B60K 15/063 |
| | | | 180/68.5 |
| 2009/0014229 A1* | 1/2009 | Fujita | B60K 13/04 |
| | | | 180/309 |
| 2010/0065359 A1* | 3/2010 | Jufuku | B60K 1/04 |
| | | | 180/68.5 |
| 2010/0101881 A1* | 4/2010 | Yoda | B60K 1/04 |
| | | | 180/68.5 |
| 2010/0116576 A1* | 5/2010 | Jufuku | B60K 1/04 |
| | | | 180/68.5 |
| 2013/0045398 A1* | 2/2013 | Katano | B60K 1/04 |
| | | | 429/7 |
| 2013/0133961 A1* | 5/2013 | Matsuda | B60K 6/40 |
| | | | 180/65.22 |
| 2013/0241282 A1* | 9/2013 | Ikeno | B60R 16/0215 |
| | | | 307/10.1 |
| 2013/0248264 A1* | 9/2013 | Matsuda | B60K 1/04 |
| | | | 180/65.22 |
| 2013/0248267 A1* | 9/2013 | Nitawaki | B60K 1/04 |
| | | | 180/68.5 |
| 2013/0248268 A1* | 9/2013 | Matsuda | B60K 1/04 |
| | | | 180/68.5 |
| 2013/0319779 A1* | 12/2013 | Nitawaki | B60L 11/1874 |
| | | | 180/68.5 |
| 2013/0327583 A1* | 12/2013 | Nitawaki | B60K 1/04 |
| | | | 180/68.5 |
| 2014/0231158 A1* | 8/2014 | Tohara | B60K 1/04 |
| | | | 180/65.21 |
| 2014/0262573 A1* | 9/2014 | Ito | B60K 1/04 |
| | | | 180/68.5 |
| 2015/0197144 A1* | 7/2015 | Jarocki | B60K 1/04 |
| | | | 180/232 |
| 2017/0025902 A1* | 1/2017 | Yuasa | H04B 5/0093 |

FOREIGN PATENT DOCUMENTS

| | | |
|---|---|---|
| JP | 2006-051938 A | 2/2006 |
| JP | 2006-051942 A | 2/2006 |
| JP | 2006-056510 A | 3/2006 |
| JP | 2008-037305 A | 2/2008 |

* cited by examiner

FIG.8

VEHICLE FLOOR LOWER STRUCTURE

CROSS-REFERENCE TO RELATED APPLICATION

This application is claims priority under 35 USC 119 from Japanese Patent Application, No. 2015-206559 filed Oct. 20, 2015, the disclosure of which is incorporated by reference herein in its entirety.

BACKGROUND

Technical Field

Preferred embodiments relate to a vehicle floor lower structure.

Related Art

Vehicle fuel tank placement structures are conventionally known in vehicles including a floor tunnel between a driving seat and a front passenger seat, in which a portion of a fuel tank placed under the floor is disposed inside the floor tunnel, and a vehicle width direction outside end portion of the fuel tank juts outs as far as the vehicle body lower side of the driving seat and the front passenger seat, thereby securing the capacity of the fuel tank (see, for example, Japanese Patent Application Laid-Open (JP-A) No. 2000-85382).

SUMMARY

However, when the vehicle width direction outer side end portion of the fuel tank juts out as far as the vehicle body lower side of the driving seat and the front passenger seat in order to secure the capacity of the fuel tank, an exhaust pipe extending from an engine needs to be routed with a large detour toward a side of a rocker extending along the vehicle body front-rear direction at a vehicle width direction outer side lower end portion, and there is an issue in that the routing geometry of the exhaust pipe becomes complex.

The preferred embodiments obtain a vehicle floor lower structure capable of suppressing a routing geometry of an exhaust pipe from becoming complex, while suppressing a reduction in the capacity of a fuel tank.

A vehicle floor lower structure of one aspect of the disclosure includes a floor panel configuring a floor of a vehicle and formed with a floor tunnel, that projects out toward a vehicle body upper side and extends along a vehicle body front-rear direction, the floor tunnel is disposed at a vehicle width direction center of the floor panel, a fuel tank that is disposed at a vehicle body lower side of the floor panel and that includes a main tank section disposed inside the floor tunnel and an extension tank section, that is disposed inside the floor tunnel and that projects out from the main tank section toward a vehicle body front side or a vehicle body rear side, and an exhaust pipe that extends from an engine and that is routed so as to pass by inside the floor tunnel at vehicle width direction outer sides of the main tank section and the extension tank section.

In the first aspect, the main tank section of the fuel tank is disposed inside the floor tunnel, and the extension tank section that projects out from the main tank section toward the vehicle body front side or the vehicle body rear side is also disposed inside the floor tunnel. The exhaust pipe is routed so as to pass by inside the floor tunnel at the vehicle width direction outer sides of the main tank section and the extension tank section. Namely, the exhaust pipe is routed without a large detour toward a side of a rocker. Thus, the routing geometry of the exhaust pipe is suppressed from becoming complex, while a reduction in the capacity of the fuel tank is also suppressed.

A vehicle floor lower structure of another aspect of the disclosure includes the vehicle floor lower structure of the one aspect, wherein the fuel tank includes a sub tank section projecting out from the main tank section toward a first side in the vehicle width direction outer sides of the main tank section, and the exhaust pipe is routed so as to pass by at a second side in the vehicle width direction outer sides of the main tank section.

In the other aspect, the fuel tank includes the sub tank section projecting out from the main tank section toward the first side in the vehicle width direction outer sides of the main tank section, and the exhaust pipe is routed so as to pass by at the second side at the vehicle width direction outer sides of the main tank section. Namely, the exhaust pipe is routed without a large detour toward vehicle width direction outer side of the sub tank section (the rocker side). Thus, the routing geometry of the exhaust pipe is suppressed from becoming complex, while a reduction in the capacity of the fuel tank is also further suppressed.

A vehicle floor lower structure of still another aspect of the disclosure includes the vehicle floor lower structure of the other aspect, wherein a permitting section through which a portion of the exhaust pipe passes is formed at a lower end portion of the floor tunnel.

In the still other aspect, the permitting section through which a portion of the exhaust pipe passes is formed in the lower end portion of the floor tunnel. Thus, the routing geometry of the exhaust pipe is further suppressed from becoming complex, while a reduction in the capacity of the fuel tank is also suppressed compared to configurations in which a permitting section through which a portion of the exhaust pipe passes is not formed in the lower end portion of the floor tunnel.

DETAILED DESCRIPTION

Detailed explanation follows regarding exemplary embodiments according to the present invention, based on the examples illustrated in the drawings. Note that for ease of explanation, in each of the drawings, the arrow UP indicates the vehicle body upper direction, the arrow FR indicates the vehicle body front direction, and the arrow LH indicates the vehicle body left direction. In the below explanation, unless specifically stated otherwise, reference to the up-down, front-rear, and left-right directions refers to up-down in the vehicle body up-down direction, front-rear in the vehicle body front-rear direction, and left-right in the vehicle body left-right direction.

First Exemplary Embodiment

As illustrated in FIGS. 1 to 6, a vehicle floor lower structure 10 according to a first exemplary embodiment includes a fuel tank 20 and a battery pack 30 disposed at a vehicle body lower side of a floor panel 14 configuring a floor of a vehicle 12, and disposed between an axle of front wheels 66 and an axle of rear wheels 68 that are separated in the front-rear direction. An engine 16 is installed in a front section between the left and right front wheels 66 of the vehicle 12, and gasoline serving as fuel supplied to the engine 16 is stored in the fuel tank 20.

A traction motor (not illustrated in the drawings) used to drive the front wheels is also installed in the front section of the vehicle 12, and the battery pack 30 is a power source that drives the traction motor. Namely, the vehicle 12 is what is referred to as a hybrid vehicle that is capable of running on not only gasoline, but also electricity. The battery pack 30 is disposed in close proximity to a rear side of the fuel tank 20. In other words, the fuel tank 20 is disposed in close proximity to a front side of the battery pack 30.

Figure 5:
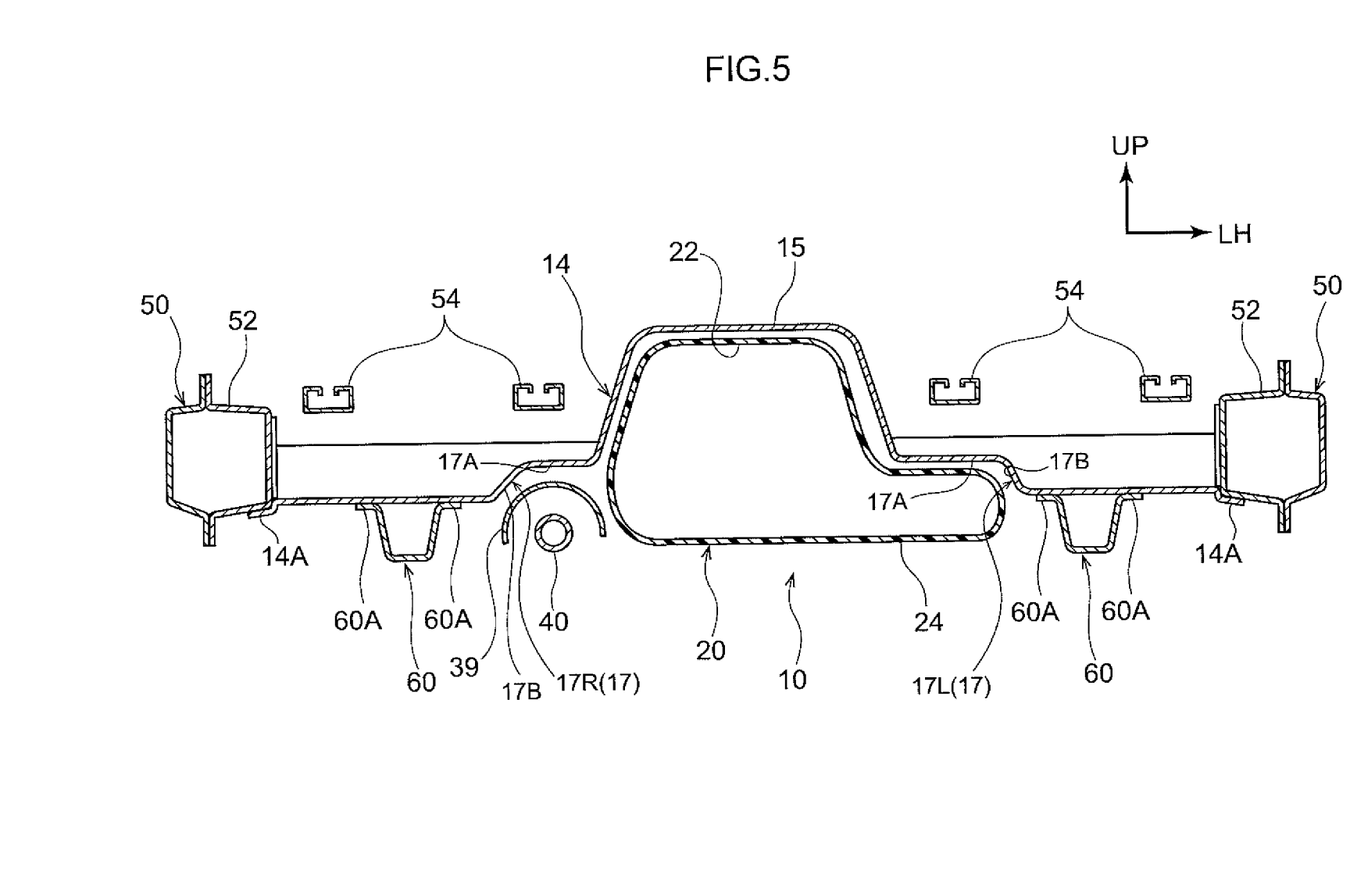
FIG. 5 is a cross-section along arrow line X-X in FIG. 4.

To explain in detail, as illustrated in FIG. 5, a tunnel section 15, serving as a floor tunnel, is formed projecting out toward an upper side and extending along a front-rear direction at a substantially vehicle width direction center portion of the floor panel 14. The tunnel section 15 is formed in a substantially isosceles trapezoidal shape in face-on cross-section view, and widened sections 17 that widen toward vehicle width direction outer sides are respectively formed in lower end portions of the tunnel section 15.

Each widened section 17 is formed of an upper wall 17A, and an inner wall 17B extending downward from a vehicle width direction outer side end portion of the upper wall 17A. At least a portion of the widened section 17 (a portion of the upper wall 17A) juts out as far as a vehicle body lower side of a front seat 56, respectively serving as a driving seat or a front passenger seat. Note that in the below explanation, the widened section 17 at the right side is sometimes referred to as widened section 17R, and the widened section 17 at the left side is sometimes referred to as widened section 17L.

Figure 1:
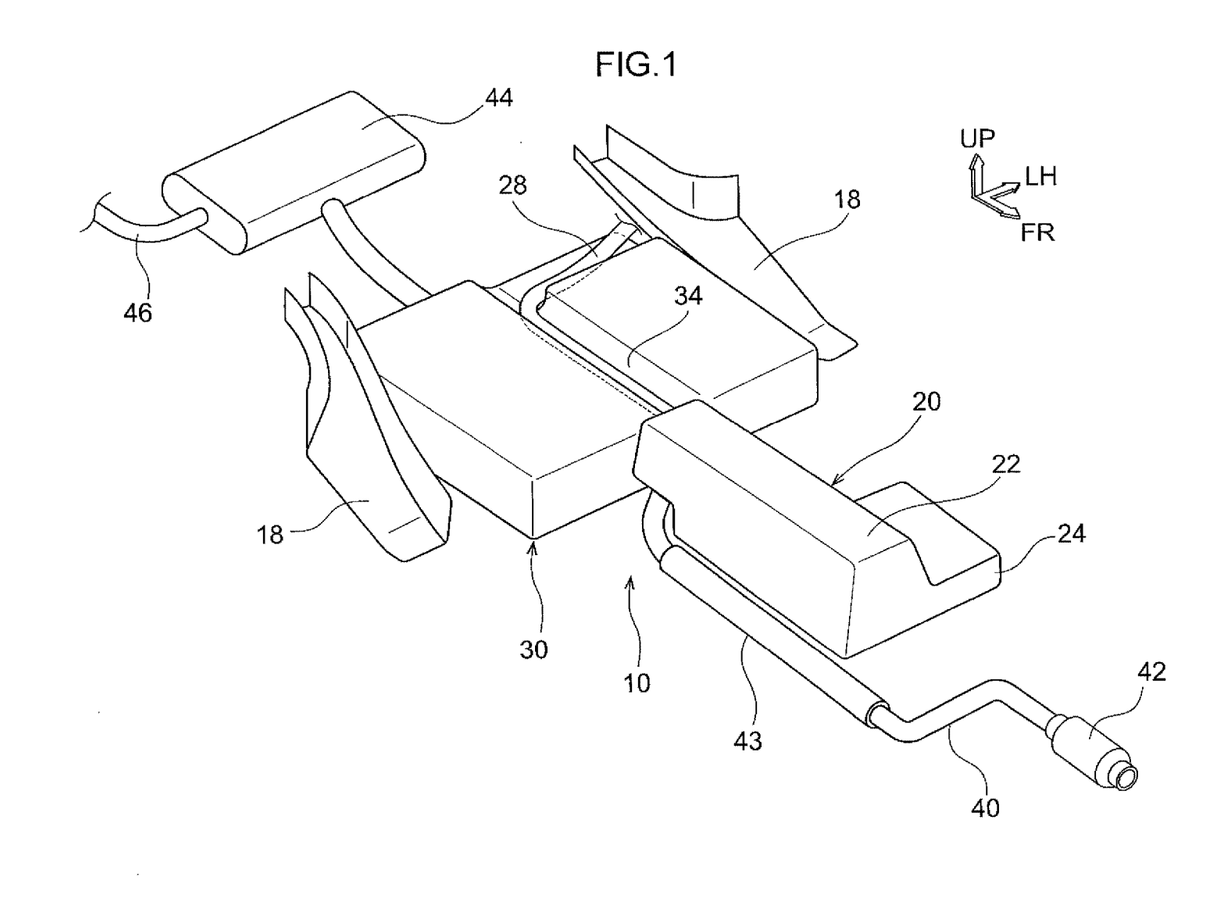
FIG. 1 is a perspective view illustrating a vehicle floor lower structure according to a first exemplary embodiment as viewed diagonally from above.
Figure 2:
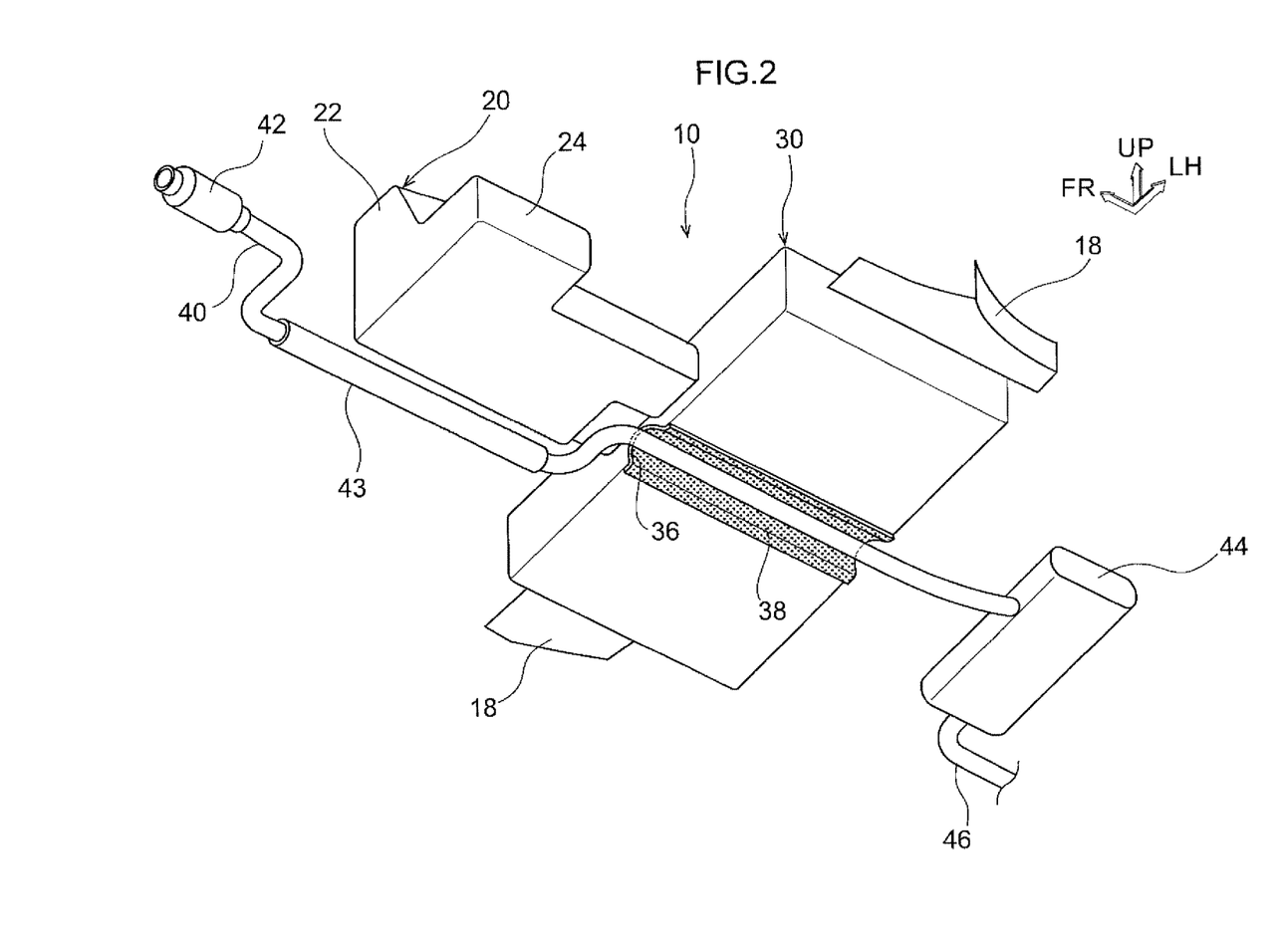
FIG. 2 is a perspective view illustrating a vehicle floor lower structure according to the first exemplary embodiment as viewed diagonally from below.
Figure 3:
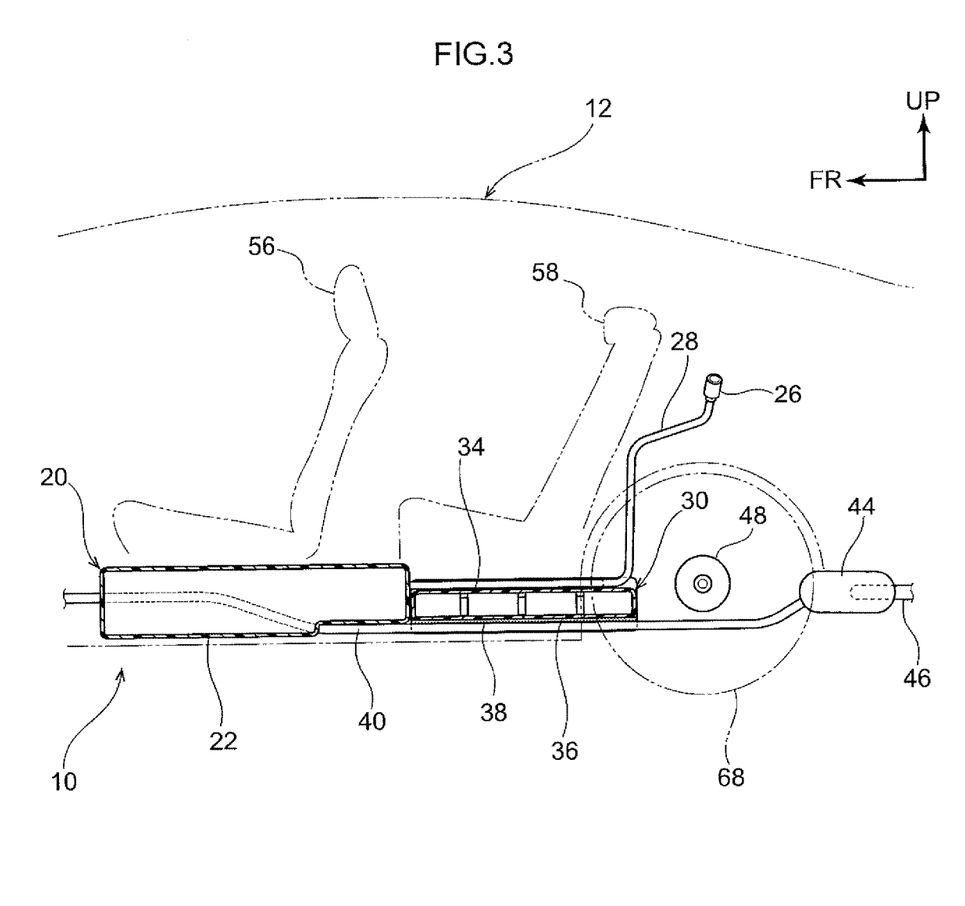
FIG. 3 is side view illustrating a partial cross-section of a vehicle including a vehicle floor lower structure according to the first exemplary embodiment.
Figure 4:
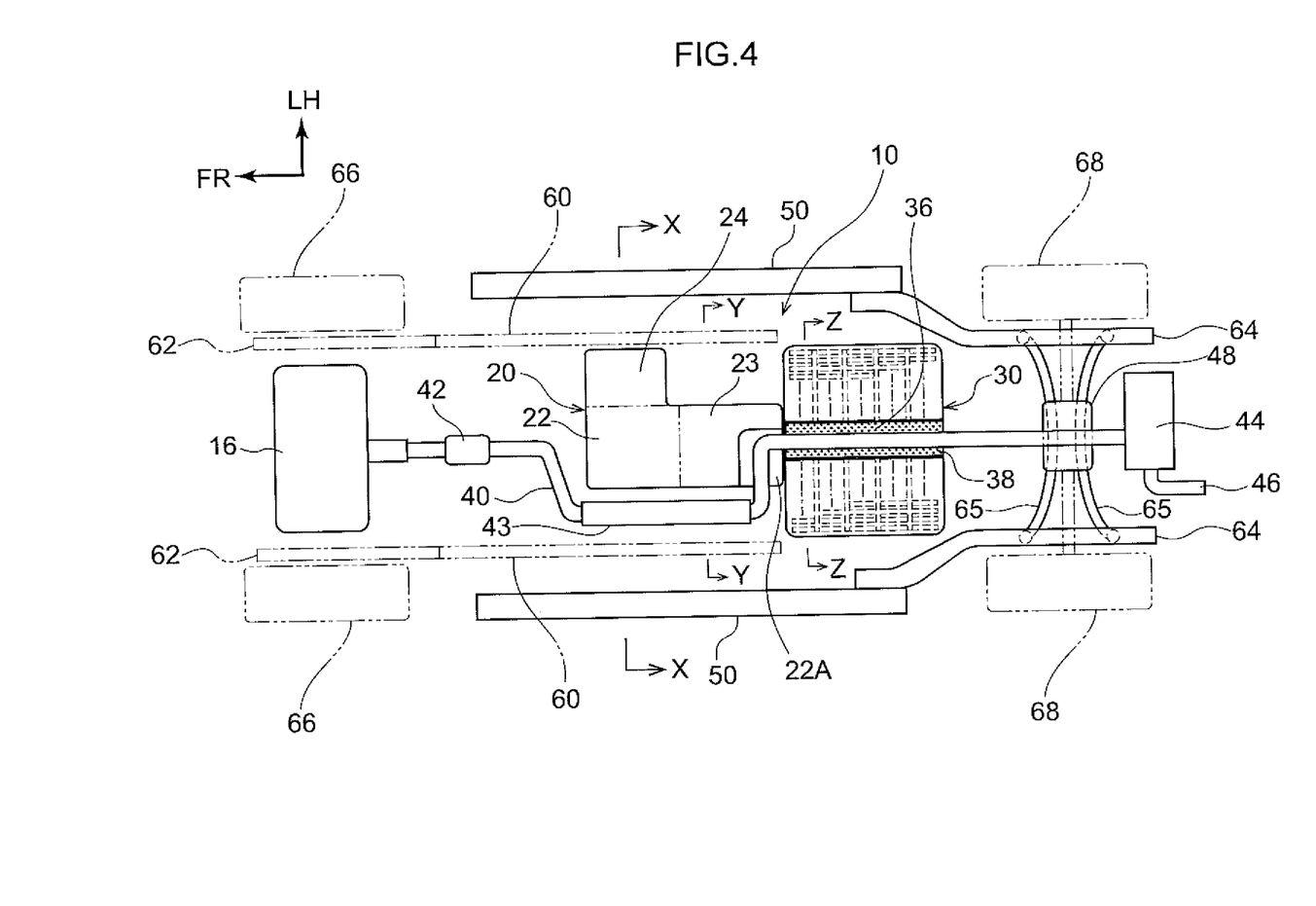
FIG. 4 is a bottom view illustrating a vehicle including a vehicle floor lower structure according to the first exemplary embodiment.

As illustrated in FIGS. 1, 2, and 4, the fuel tank 20 is formed in a substantially "L" shape in plan view using a resin material. The fuel tank 20 includes a main tank section 22 disposed at a substantially vehicle width direction center portion, an extension tank section 23 extending from a rear portion of the main tank section 22 toward the rear side, and a sub tank section 24 extending from a front portion of the main tank section 22 toward the left side (a first side at the vehicle width direction outer sides). Note that in FIG. 4, the main tank section 22, the extension tank section 23, and the sub tank section 24 are illustrated partitioned by hypothetical lines.

Figure 6:
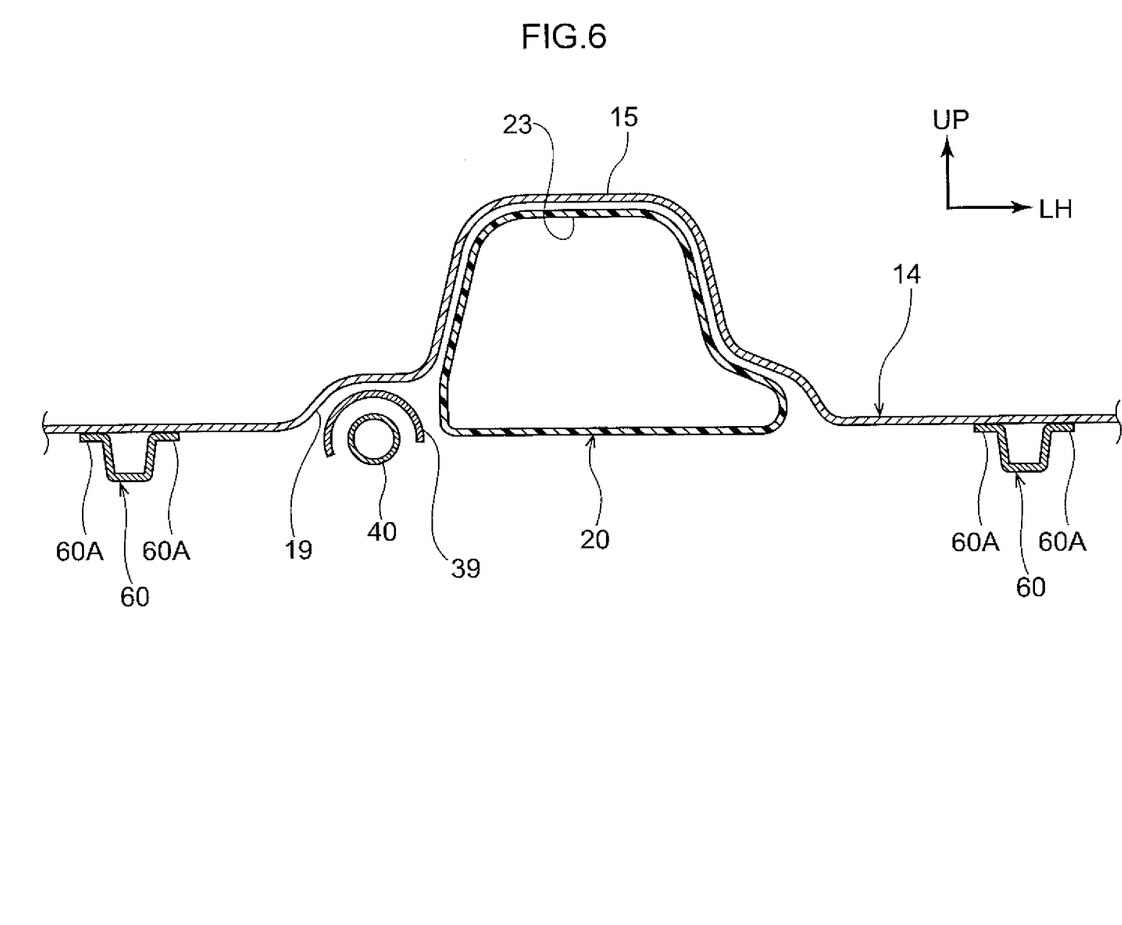
FIG. 6 is a cross-section along arrow line Y-Y in FIG. 4.

As illustrated in FIGS. 5 and 6, the main tank section 22 and the extension tank section 23 are each formed in a substantially isosceles trapezoidal shape in face-on cross-section view, and are disposed inside the tunnel section 15. Note that, as illustrated in FIG. 5, a lower end portion of the main tank section 22 at the opposite side (right side) to the sub tank section 24 faces the inner wall 17B of the right side widened section 17R in the vehicle width direction. The main tank section 22 and the extension tank section 23 are integrally formed, and are in communication with each other.

The sub tank section 24 is formed in a substantially rectangular shape that has a smaller height than the main tank section 22 in face-on cross-section view, and is disposed inside the left side widened section 17L. The main tank section 22 and the sub tank section 24 are integrally formed, and are in communication with each other. The capacity of the fuel tank 20 is secured by the above configuration. Note that, as illustrated in FIG. 6, a left side of a lower end portion of the extension tank section 23 projects out slightly toward the vehicle width direction outer side so as to continue on from the sub tank section 24, and the tunnel section 15 of the floor panel 14 is also formed in a corresponding shape to the lower end portion of the extension tank section 23.

As illustrated in FIGS. 1 to 4, the battery pack 30 is formed in a substantially rectangular shape that is longer in the vehicle width direction than in the front-rear direction in plan view, and includes multiple battery cells 32 (see FIG. 7) inside. The battery pack 30 is disposed at a substantially vehicle width direction center portion at a vehicle body lower side of rear seats 58, and a left and right pair of rear floor members 18 are respectively disposed at vehicle width direction outer sides of the battery pack 30.

A fuel supply port 26 for supplying gasoline to the fuel tank 20 is disposed at an upper rear side of the battery pack 30. The fuel tank 20 and the fuel supply port 26 are connected to each other by an inlet pipe 28. Specifically, a front end portion (one end portion) of the inlet pipe 28 is placed in communication with a rear end portion of the extension tank section 23 of the fuel tank 20, and a rear end portion (another end portion) of the inlet pipe 28 is in communication with the fuel supply port 26.

The inlet pipe 28 is routed at an upper side of the battery pack 30. Specifically, an upper recessed portion 34 (see FIG. 7 also) is formed in a substantially semicircular arc shaped cross-section and extends along the front-rear direction at a substantially vehicle width direction center portion of an upper face of the battery pack 30. A portion of the inlet pipe 28 is routed so as to pass through the upper recessed portion 34 and extends along the front-rear direction.

An exhaust pipe 40 is routed from a substantially vehicle width direction center portion of the engine 16 toward the rear side. A catalyst 42 is placed in communication with the exhaust pipe 40 that is between the engine 16 and the fuel tank 20. Harmful substances in the exhaust gas discharged from the engine 16 into the exhaust pipe 40 are cleaned by being oxidized or reduced by the catalyst 42.

The exhaust pipe 40 that is further toward the rear side from the catalyst 42 bends toward the right side (vehicle width direction outer side), and then bends back toward the rear side. Namely, a portion of the exhaust pipe 40 passes beside the main tank section 22 at the right side ("a second side at the vehicle width direction outer sides" in the Claims) of the fuel tank 20, this being the opposite side to the sub tank section 24, extending toward the rear side. This portion of the exhaust pipe 40 is disposed inside the right side widened section 17R of the tunnel section 15 (see FIG. 5).

As illustrated in FIG. 6, a permitting section 19 with a curve shaped cross-section that is continuous to the right side widened section 17R is formed at the lower end portion of the tunnel section 15 of the floor panel 14 at the right side of the extension tank section 23 of the fuel tank 20. A portion of the exhaust pipe 40 is disposed inside the permitting section 19.

Note that the portion of the exhaust pipe 40 that passes by at the right side of the main tank section 22 inside the widened section 17R and that passes by at the right side of the extension tank section 23 inside the permitting section 19 has a two layer pipe structure, and configures a sub muffler 43. A thermal insulation member 39 with a substantially semicircular arc shaped cross-section is disposed extending along the front-rear direction between this portion of the exhaust pipe 40 and the widened section 17R and the permitting section 19.

As illustrated in FIGS. 1, 2, and 4, after passing by at the right sides of the main tank section 22 and the extension tank section 23 and extending toward the rear side, the exhaust pipe 40 bends toward the vehicle width direction inner side (left side) at a rear portion of the extension tank section 23, and then bends back toward the rear side. A recessed portion 22A with a substantially rectangular shape in bottom face view to permit passage of the exhaust pipe 40 is thereby formed at a lower face at the rear portion of the extension tank section 23.

The exhaust pipe 40 is routed so as to pass by at a vehicle body lower side of the battery pack 30 extending toward the rear side. Accordingly, the exhaust pipe 40 mainly passes through at a substantially vehicle width direction center portion of the vehicle 12 excluding a portion of the exhaust pipe 40 that passes by at the right sides of the main tank section 22 and the extension tank section 23 of the fuel tank 20 inside the widened section 17R and the permitting section 19.

Specifically, a lower recessed section 36 (see FIG. 7 also) with a substantially semicircular arc shaped cross-section extending along the front-rear direction is formed in a substantially vehicle width direction center portion of a lower face of the battery pack 30. A portion of the exhaust pipe 40 is disposed so as to pass through the lower recessed section 36 extending toward the rear side. Note that a thermal insulation member 38 (see FIG. 7 also) with a substantially semicircular arc shaped cross-section extending along the front-rear direction is provided in advance inside the lower recessed section 36, and the exhaust pipe 40 is routed so as to pass by at the vehicle body lower side of the thermal insulation member 38.

After passing through the lower recessed section 36 of the battery pack 30 extending toward the rear side, the exhaust pipe 40 is placed in communication with a main muffler 44. The main muffler 44 is formed in a substantially elliptical column shape with its axial direction along the vehicle width direction. The exhaust pipe 40 is connected to a substantially vehicle width direction center portion at a front end portion of the main muffler 44. A muffler cutter 46 extends from a side portion of the main muffler 44 toward the rear side.

As illustrated in FIG. 5, vehicle width direction outer side end portions 14A of the floor panel 14 are respectively joined to lower faces of rocker inner panels 52 of a left and right pair of rockers 50 that respectively extend along the front-rear direction at either side of the vehicle 12. As illustrated in FIGS. 4 to 6, a left and right pair of under reinforcements 60 that extend along the front-rear direction are respectively joined to lower faces of the floor panel 14 that are further toward the vehicle width direction inner sides from the rockers 50, and further toward the vehicle width direction outer sides from the fuel tank 20.

Each under reinforcement 60, serving as a vehicle body frame member, is formed with a substantially hat shaped cross-section profile. Flange portions 60A at both the left and right side of each under reinforcement 60 are joined to the lower face of the floor panel 14 by welding or the like to form a chamber profile. Note that the right side widened section 17R and permitting section 19, through which the portion of the exhaust pipe 40 respectively passes, are formed between the right side under reinforcement 60 and the lower end portions of the main tank section 22 and extension tank section 23.

Each under reinforcement 60 is disposed at the front side of the battery pack 30 in side-on view. Front end portions of the respective under reinforcements 60 are integrally joined to rear end portions of a left and right pair of front side members 62, each extending toward the front side.

Left and right pairs of seat rails 54 for providing the respective front seats 56 (the driving seat and front passenger seat) are respectively disposed at either left and right side of the tunnel section 15, at an upper face of the floor panel 14, Each seat rail 54 extends along the front-rear direction and is configured such that a front-rear direction position of the respective front seat 56 is adjustable.

A traction motor 48 used to drive the rear wheels is provided at a rear side of the battery pack 30 between the left and right rear wheels 68. Namely, the vehicle 12 is configured capable of switching between front-wheel drive and four-wheel drive.

Outer walls of front end portions of a left and right pair of rear side members 64 are respectively joined to the rocker inner panels 52 at rear end portions of the respective rockers 50. Each rear side member 64 extends toward the rear side, Rear sub frames 65 that couple between the left and right rear side members 64 are respectively disposed at front and rear sides of the traction motor 48.

Explanation follows regarding operation of the vehicle floor lower structure 10 according to the first exemplary embodiment configured as described above.

As described above, the fuel tank 20 is disposed at the front side of the battery pack 30. Thus, when the vehicle 12 has been in a rear-end collision, collision load is directly input to the battery pack 30 through the respective rear sub frames 65, and direct input of a collision load to the fuel tank 20 is reduced or suppressed. This enables the input of collision load toward the fuel tank 20 during a rear-end collision of the vehicle 12 to be decreased, enabling issues such as damage to the fuel tank 20 to be reduced or prevented from occurring.

The fuel tank 20 and the battery pack 30, these being heavy components, are disposed between the axis of the front wheels 66 and the axis of the rear wheels 68, and are arranged along the front-rear direction at the vehicle body lower side of the floor panel 14. This enables distribution of load at the front section side and the rear section side of the vehicle 12 to be optimized, and also enables the center of gravity of the vehicle 12 to be lowered. The maneuverability of the vehicle 12 is accordingly improved.

Note that, when the fuel tank 20 and the battery pack 30 are disposed at the vehicle body lower side of the floor panel 14, there is also an advantage in that the design of the body further toward the upper side of the floor panel 14 is not restricted as a result. In particular, when the battery pack 30 is disposed at the vehicle body lower side of the floor panel 14, there is an advantage in that luggage space inside the vehicle 12 can be increased compared to configurations in which the battery pack 30 is disposed at the rear side of the rear seats 58.

The fuel tank 20 is formed including the main tank section 22, the extension tank section 23, and the sub tank section 24, and the main tank section 22 and the extension tank section 23 are disposed inside the tunnel section 15, enabling their height to be made higher. This enables the vehicle width direction lengths of the main tank section 22 and the extension tank section 23 to be reduced, while suppressing a reduction in the capacity of the fuel tank 20.

This enables a portion of the exhaust pipe 40 to be routed so as to pass by inside the tunnel section 15 at the right side of the main tank section 22 and the extension tank section 23 at the opposite side to the side where the sub tank section 24 projects out. This also enables bend angles of the exhaust pipe 40 in the horizontal direction at a front side of the main tank section 22 and a rear side of the extension tank section 23 to be reduced to a minimum (see FIG. 4).

In particular, the widened section 17R and the permitting section 19 where the portion of the exhaust pipe 40 is respectively disposed are formed at the lower end portion of the tunnel section 15 of the floor panel 14. The widened section 17R and the permitting section 19 are located at the right side of the main tank section 22 and the extension tank section 23, thereby also enabling bend angles of the exhaust pipe 40 in the vertical direction to be reduced to a minimum (see FIG. 3).

This enables a routing geometry of the exhaust pipe 40 to be suppressed from becoming complex, while preventing a reduction in the capacity of the fuel tank 20. This enables a back pressure inside the exhaust pipe 40 to be suppressed from increasing compared to configurations in which, for example, the exhaust pipe 40 is routed with a large detour at the vehicle width direction outer side (the rocker 50 side) of the sub tank section 24 of the fuel tank 20. This accordingly enables a reduction in engine output to be suppressed.

Since the vehicle width direction lengths of the main tank section 22 and the extension tank section 23 of the fuel tank 20 can be reduced in this manner, the under reinforcements 60, serving as vehicle body frame members extending along the front-rear direction, can be disposed at the vehicle width direction outer sides of the fuel tank 20 and the exhaust pipe 40. This enables the fuel tank 20 and the exhaust pipe 40 to be protected, not only in a rear-end collision of the vehicle 12, but also in a front-end collision or a side-on collision of the vehicle 12.

The vehicle 12 including the vehicle floor lower structure 10 according to the present exemplary embodiment enables the traction motor 48 used to drive the rear wheels to be disposed at the rear side of the battery pack 30. This enables product appeal to be increased compared to hybrid vehicles which are only disposed with a traction motor used for front-wheel drive and which are not capable of switching between front-wheel drive and four-wheel drive.

The inlet pipe 28 is routed at the upper side of the battery pack 30, thereby enabling the inlet pipe 28 to be protected by the battery pack 30. Namely, this enables the impact from a flying stone or the like while the vehicle 12 is travelling to be suppressed or prevented from being imparted to the inlet pipe 28. The upper recessed portion 34 in which a portion of the inlet pipe 28 is disposed is formed at the upper face of the battery pack 30, thereby also enabling the inlet pipe 28 to be protected by the battery pack 30 during a collision of the vehicle 12.

The exhaust pipe 40 is routed at the vehicle body lower side of the battery pack 30 and the inlet pipe 28 is disposed at the opposite side of the battery pack 30 to the exhaust pipe 40, thereby enabling the inlet pipe 28 to be disposed at a distance from the exhaust pipe 40. This enables heat damage to the inlet pipe 28 by the exhaust pipe 40 to be reduced.

The lower recessed section 36 in which a portion of the exhaust pipe 40 is disposed is formed in the lower face of the battery pack 30, thereby enabling space to install the exhaust pipe 40 to be secured, even if the vehicle 12 has a low height.

The thermal insulation member 38 is disposed between the battery pack 30 and the exhaust pipe 40, thereby also enabling heat damage to the battery pack 30 by the exhaust pipe 40 to be reduced.

Second Exemplary Embodiment

Explanation follows a vehicle floor lower structure 10 according to a second exemplary embodiment. Note that locations that are similar to the first exemplary embodiment are appended with the same reference numerals, and detailed explanation thereof including common operation is omitted as appropriate.

Figure 7:
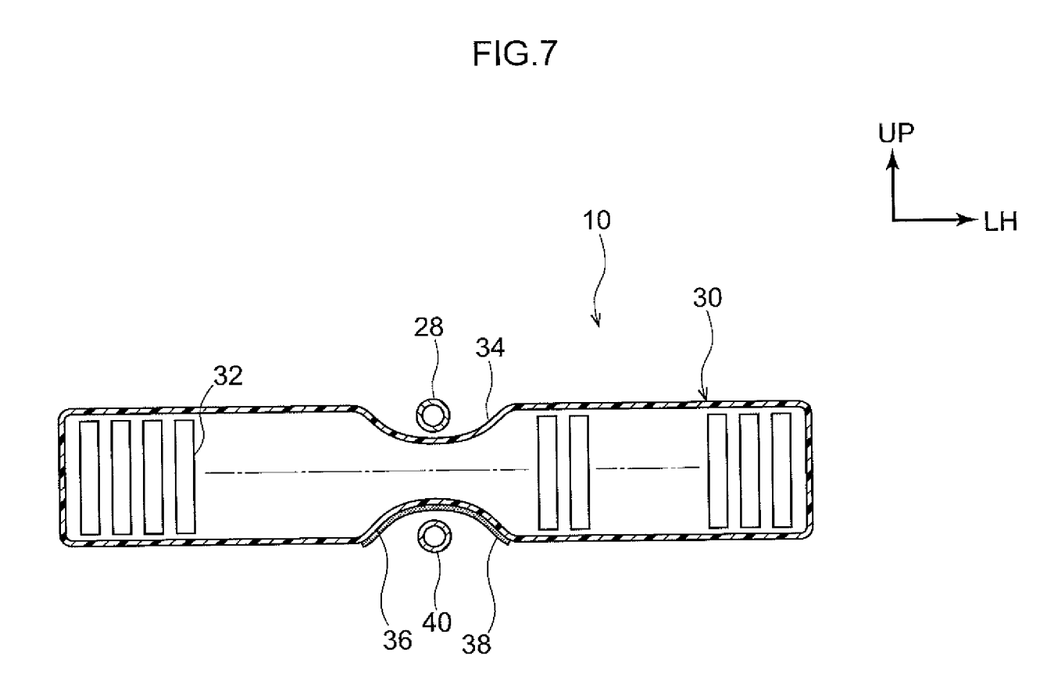
FIG. 7 is a cross-section along arrow line Z-Z in FIG. 4.
Figure 8:
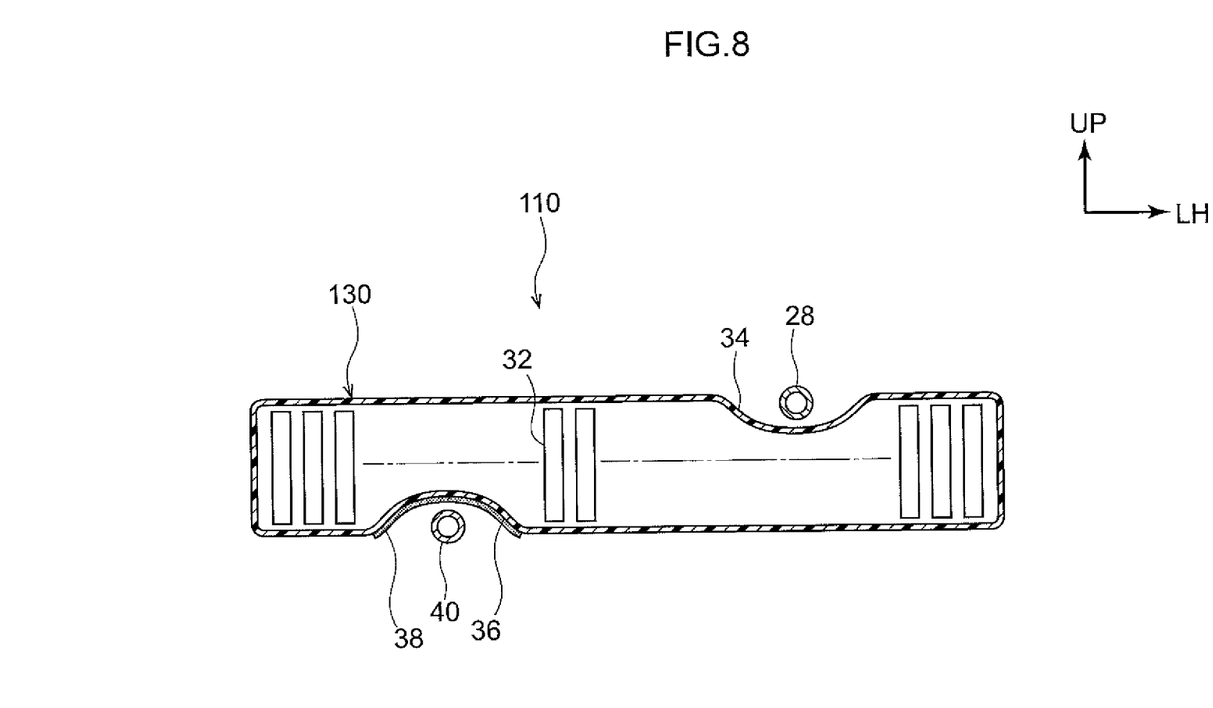
FIG. 8 is a cross-section corresponding to FIG. 7, illustrating a battery pack configuring a vehicle floor lower structure according to a second exemplary embodiment.

As illustrated in FIG. 8, the vehicle floor lower structure 110 according to the second exemplary embodiment is different from that in the first exemplary embodiment in the respect that the upper recessed portion 34 and lower recessed section 36 of the battery pack 130 are formed separated from each other in the vehicle width direction in plan view and face-on view. Namely, as illustrated in FIG. 7, in the vehicle floor lower structure 10 according to the first exemplary embodiment, the upper recessed portion 34 and the lower recessed section 36 are both formed in the substantially vehicle width direction center portion (in the same position as each other in plan view and face-on view), such that the thickness of the substantially vehicle width direction center portion of the battery pack 30 is locally thinner.

However, in the vehicle floor lower structure 110 according to the second exemplary embodiment, the upper recessed portion 34 and the lower recessed section 36 are not formed in the same upper and lower positions, thereby enabling a portion with a locally thin thickness to be prevented from occurring in the battery pack 130, enabling a substantially uniform thickness to be secured. The rigidity of the battery pack 130 can accordingly be made higher than in the first exemplary embodiment. This enables the number of battery cells 32 to be increased compared to the first exemplary embodiment, thereby enabling a driving range with the traction motor to be extended.

When the lower recessed section 36 is formed toward the right side of the battery pack 130 in this manner, the portion of the exhaust pipe 40, that passes by at the right side of the main tank section 22 and the extension tank section 23 of the fuel tank 20 inside the widened section 17R and the permitting section 19 extending toward the rear side, can be extended toward the rear side without being bent toward the vehicle width direction inner side. This enables the routing geometry of the exhaust pipe 40 to be further suppressed from becoming complex, and enables a reduction in engine output to be further suppressed.

The vehicle floor lower structures 10 and 110 according to the present exemplary embodiments have been explained above based on the drawings; however, the vehicle floor lower structures 10 and 110 according to the present exemplary embodiments are not limited to that illustrated in the drawings, and obviously design modifications may be implemented as appropriate within a range not departing from the scope of the present claims. For example, a configuration may be applied in which neither the upper recessed portion 34 nor the lower recessed section 36 are formed in the upper face and lower face of the battery pack 30.

As long as the configuration is such that heat damage to the battery pack 30 from the exhaust pipe 40 is reduced, a configuration may be applied in which the thermal insulation member 38 is not provided inside the lower recessed section 36. The exhaust pipe 40 is not limited to a configuration that is routed bending as described above, and the exhaust pipe 40 may be configured routed curving in a circular arc shape in plan view, for example. In the drawings, the height of the battery pack 30 is higher than the height of the sub tank section 24, but is lower than the height of the main tank section 22 and the extension tank section 23; however, there is no limitation thereto.

The positions of the main tank section 22 and the extension tank section 23 may be inverted. Namely, a configuration may be applied in which the extension tank section 23 projects out from a front portion of the main tank section 22 toward the front side. The permitting section 19 is not limited to a configuration formed with a curved cross-section profile, and may be configured formed with a bent cross-section profile, similarly to the widened section 17R, for example.

What is claimed is:

1. A vehicle floor lower structure comprising:

a floor panel configuring a floor of a vehicle and formed with a floor tunnel, that projects out toward a vehicle body upper side and extends along a vehicle body front-rear direction, the floor tunnel is disposed at a vehicle width direction center of the floor panel and extends in a vehicle body up-down direction above other surfaces of the floor panel, wherein a widened section that is widened toward vehicle width direction outer sides is formed in a lower end portion of the floor tunnel, and the widened section includes an upper wall that is disposed between an upper surface of the floor tunnel and other surfaces of the floor panel in the vehicle body up-down direction;

a fuel tank that is disposed at a vehicle body lower side of the floor panel and that includes a main tank section disposed inside the floor tunnel and an extension tank section that is disposed inside the floor tunnel and that projects out from a front end of the main tank section toward a vehicle body front side inside the floor tunnel or a vehicle body rear side inside the floor tunnel; and an exhaust pipe that is configured to extend from an engine and that is routed so as to pass by inside the floor tunnel at a vehicle width direction outer side of the main tank section and the extension tank section.

2. The vehicle floor lower structure of claim 1, wherein:

the fuel tank includes a sub tank section projecting out from the main tank section toward a first side in the vehicle width direction outer sides of the main tank section; and the exhaust pipe is routed so as to pass by at a second side in the vehicle width direction outer sides of the main tank section.

3. The vehicle floor lower structure of claim 2, wherein a permitting section through which a portion of the exhaust pipe passes is formed at a lower end portion of the floor tunnel.

4. The vehicle floor lower structure of claim 1, wherein:

the fuel tank includes a sub tank projecting out from the main tank section toward the vehicle width direction outer sides of the main tank section, and is disposed inside the widened section.

* * * * *